United States Patent [19]
Ritt et al.

[11] Patent Number: 5,853,223
[45] Date of Patent: Dec. 29, 1998

[54] HEIGHT-ADJUSTABLE CHAIR ARM ASSEMBLY

[75] Inventors: Robert T. Ritt, Holand Township, Ottawa County; Steve J. Nemeth, Jr., Park Township, Ottawa County; Richard N. Roslund, Jr., Georgetown Township, Ottawa County, all of Mich.

[73] Assignee: Haworth, Inc., Holland, Mich.

[21] Appl. No.: 857,032

[22] Filed: May 15, 1997

Related U.S. Application Data

[62] Division of Ser. No. 486,613, Jun. 7, 1995, Pat. No. 5,647,638.

[51] Int. Cl.⁶ .................................................. A47C 7/54
[52] U.S. Cl. ............................... 297/411.36; 297/411.35; 248/118.3; 248/408
[58] Field of Search .............................. 297/353, 411.35, 297/411.36, 344.18; 248/118.3, 408, 409, 423

[56] References Cited

U.S. PATENT DOCUMENTS

| | | |
|---|---|---|
| 50,042 | 9/1865 | Sherlock . |
| 232,790 | 9/1880 | Wernert . |
| 441,964 | 12/1890 | Neppert . |
| 493,111 | 3/1893 | Parsons . |
| 504,683 | 9/1893 | Peartree . |
| 2,569,834 | 10/1951 | Smith . |
| 2,584,732 | 2/1952 | Okun . |
| 3,950,027 | 4/1976 | Wilson .................................... 297/416 |
| 4,489,981 | 12/1984 | Goletski ................................... 297/411 |
| 4,674,798 | 6/1987 | Oeth et al. ............................... 297/411 |
| 4,881,424 | 11/1989 | Clark et al. ................................ 74/523 |
| 4,934,750 | 6/1990 | Eichler et al. ......................... 296/37.8 |
| 4,951,995 | 8/1990 | Teppo et al. ............................. 297/411 |
| 4,961,610 | 10/1990 | Reeder et al. ........................... 297/412 |
| 5,050,933 | 9/1991 | Tornero et al. .......................... 297/417 |
| 5,265,938 | 11/1993 | Melhuish et al. .................. 297/411.36 |
| 5,281,001 | 1/1994 | Bergsten et al. ................... 297/411.24 |
| 5,318,347 | 6/1994 | Tseng ................................. 297/411.36 |
| 5,324,096 | 6/1994 | Schultz .............................. 297/411.36 |
| 5,326,154 | 7/1994 | Williamson et al. ............. 297/411.36 |
| 5,346,284 | 9/1994 | Dauphin ................................. 297/411 |
| 5,368,365 | 11/1994 | Feldberg ............................ 297/411.36 |
| 5,369,805 | 12/1994 | Bersten et al. ..................... 297/411.35 |
| 5,380,065 | 1/1995 | Rohrer ............................... 297/411.37 |
| 5,382,079 | 1/1995 | Wilson et al. ...................... 297/411.36 |
| 5,388,892 | 2/1995 | Tornero ............................. 297/411.36 |
| 5,393,124 | 2/1995 | Neil .................................... 297/411.35 |
| 5,393,125 | 2/1995 | Watson et al. ..................... 297/411.36 |
| 5,435,626 | 7/1995 | Lai ......................................... 297/411 |
| 5,439,267 | 8/1995 | Peterson et al. ................... 297/411.36 |
| 5,620,233 | 4/1997 | Corwin ............................. 297/411.36 |

FOREIGN PATENT DOCUMENTS

| | | |
|---|---|---|
| 1 227 895 | 8/1960 | France . |
| 43 17 610 | 1/1994 | Germany . |

*Primary Examiner*—Peter R. Brown
*Attorney, Agent, or Firm*—Flynn, Thiel, Boutell & Tanis, P.C.

[57] ABSTRACT

A chair having height-adjustable arm assemblies mounted adjacent opposite sides of the seat. Each arm assembly includes a horizontally elongated armrest which adjacent one end is connected to an upper end of a support column. The support column is axially slidably supported within an elongate support tube which projects downwardly adjacent a side of the chair seat. The support column and support tube have a cooperating linear anti-friction bearing arrangement therebetween, the latter incorporating a resilient support track to eliminate circumferential clearance. A latch mechanism includes a movable latch member carried on the column and cooperating with a plurality of latch-receiving slots formed in the support tube. The latch member is activated by a push rod which projects upwardly through the support column, and at its upper end is activated by an actuating lever which is pivoted on and projects lengthwise of the armrest and terminates in an actuating button disposed under the front end of the armrest.

24 Claims, 10 Drawing Sheets

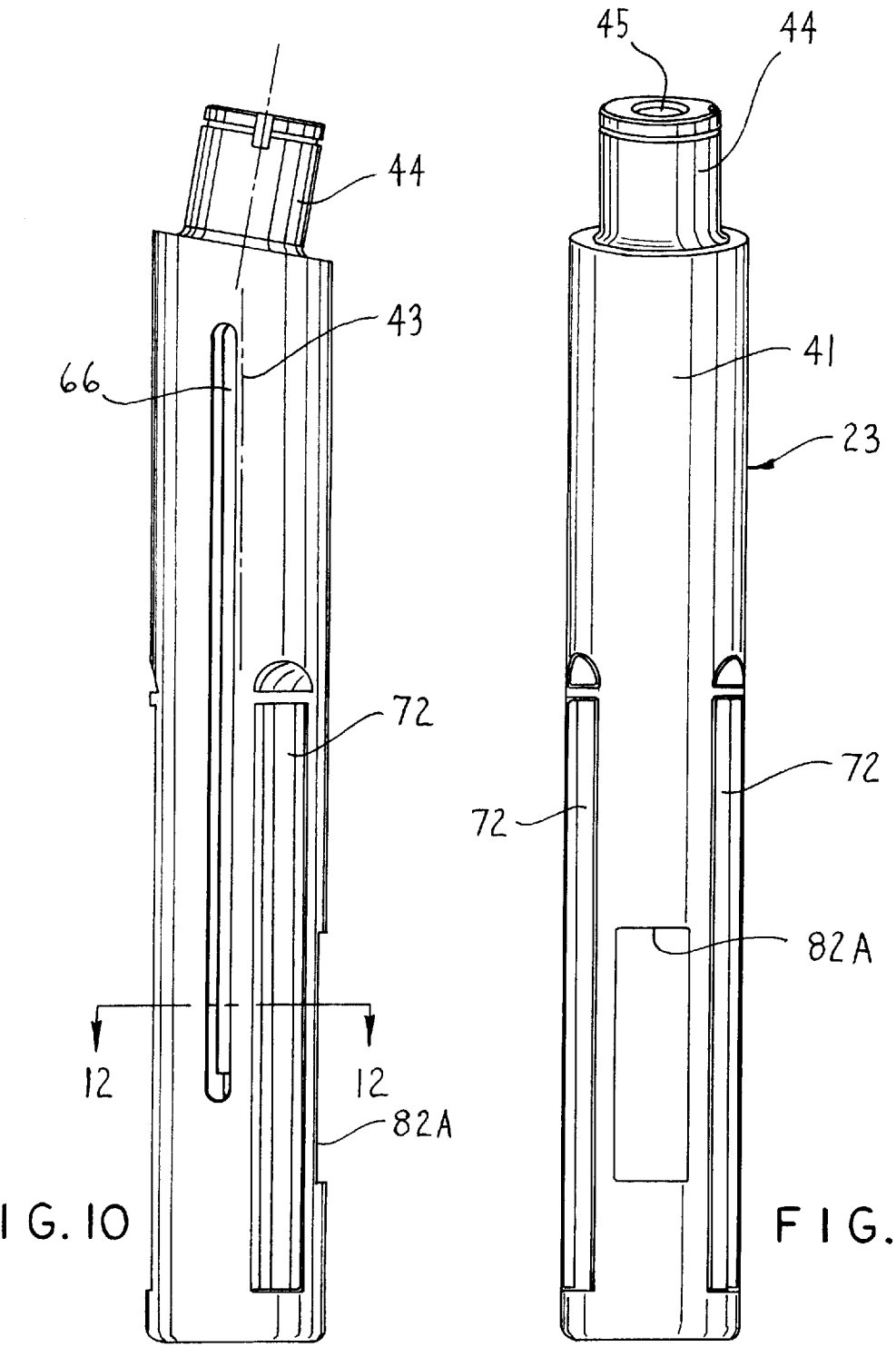

HEIGHT-ADJUSTABLE CHAIR ARM ASSEMBLY

This application is a division of Ser. No. 08/486,613 filed on Jun. 7, 1995, now U.S. Pat. No. 5,647,638.

FIELD OF THE INVENTION

This invention relates to chairs with adjustable arms and, more particularly, to an armrest which can be conveniently vertically adjusted with respect to the chair seat, and which preferably can also be horizontally swiveled relative to the chair seat.

BACKGROUND OF THE INVENTION

Chairs designed for use particularly in office environments and the like are being increasingly provided with adjustment features and contours so as to improve the ergonomics of the chair, particularly in those situations where the chair is used for long periods of time, such as when an occupant is working at a computer terminal, to provide improved comfort and healthful support of the occupant's body. One of the areas which has been addressed to improve such comfort relates to the chair arms, and some known chairs have provided arms having position adjustability, particularly with respect to the ability to vary the armrest height relative to the seat. The known chairs which possess height-adjustable chair arms typically employ vertically telescopic supports and a cooperating releasable latch arrangement for permitting height adjustment. Most known arrangements, however, have possessed disadvantages, either from a manufacturing or structural viewpoint, or from an operational viewpoint. For example, many of the structures are undesirably complex, and/or possess undesired play or looseness in the telescopic mechanism which interferes with efficient height adjustment and also detracts from the desired stability of the chair arm, and/or the overall support arrangement and cooperating latch mechanism is such as to make release of the latch and adjustment of arm height difficult or inconvenient, particularly to an occupant seated in the chair.

Accordingly, it is an object of this invention to provide a chair having a height-adjustable arm assembly associated therewith, which arm assembly significantly improves upon and overcomes many of the disadvantages as briefly summarized above.

More specifically, the improved height-adjustable chair arm assembly of this invention effectively eliminates play or clearance between the vertically telescoping members of the assembly so that height adjustment can be carried out easily and efficiently with minimal user force or effort, and at the same time the effective elimination of play or clearance provides a smooth and efficient height adjustment and also provides the chair arm, both during height adjustment and when locked in the selected position, with a secure and stable feel.

The height-adjustable arm assembly of this invention also provides an improved latching mechanism which extends through the armrest and the telescopic support column so as to permit easy and efficient unlatching and height adjustment if desired, with the occupant in a seated position being able to easily release and maintain the latching mechanism in an unlatched position while at the same time permitting the occupant to easily raise or lower the arm while seated, and then permit the latch to re-engage.

The height-adjustable arm assembly of this invention in addition preferably incorporates a swivel support cooperating between the armrest and the height-adjusting support column so that the armrest itself can be substantially horizontally swiveled and maintained in a plurality of different positions, including positions angled inwardly or outwardly or projecting forwardly or rearwardly, to increase the flexibility and comfort of use of the chair, depending upon the type of task being performed by the occupant.

Briefly, the present invention comprises a chair, such as an office-type chair, having a pair of height-adjustable arm assemblies mounted on the chair adjacent opposite sides of the seat and projecting upwardly therefrom. Each arm assembly includes a generally horizontally elongated armrest which adjacent one end is connected to an upper end of an upwardly projecting support column. The support column projects downwardly and is axially slidably supported within an elongate support tube which projects downwardly adjacent an exterior side of the chair seat. The support tube has bracket structure fixed thereto which projects downwardly and inwardly for fixed securement to the internal frame structure or chair control as associated with the underside of the seat. The support column and support tube have a cooperating linear anti-friction bearing arrangement cooperating therebetween, the latter incorporating a resilient support track mounted on the center column and cooperating with rolling bearing members so as to permit free rolling thereof during height adjustment of the column while at the same time effectively eliminating any circumferential clearance or play between the column and the support tube. A latch mechanism is also associated with the assembly and includes a movable latch member which is carried on the column and cooperates with a plurality of latch-receiving slots formed in the support tube. The latch member is activated by a push rod which movably projects upwardly through the support column, which push rod at its upper end is activated by an actuating lever which is pivoted on and projects lengthwise of the armrest and terminates in an actuating button disposed under the front end of the armrest. The connection between the rear of the armrest and the upper end of the support column, in a preferred embodiment, defines a swivel bearing having a generally vertical swivel axis, together with a cooperating rotary detent array structure, so as to enable the armrest to be horizontally swiveled relative to the support column into a plurality of different use positions.

Other objects and purposes of the invention will be apparent to persons familiar with structures of this general type upon reading the following specification and inspecting the accompanying drawings.

BRIEF DESCRIPTION OF THE DRAWINGS

FIGS. 10 and 11 are respectively side and rear elevational views of the support column which connects the armrest structure to the arm attachment bracket;

FIG. 12 is a sectional view taken generally along line 12—12 in FIG. 10;

FIG. 13 is a sectional view taken generally along line 13—13 in FIG. 6; and

FIG. 14 is an enlarged, fragmentary sectional view of a portion of FIG. 13 and specifically illustrating the resilient linear bearing arrangement.

Figure 1:
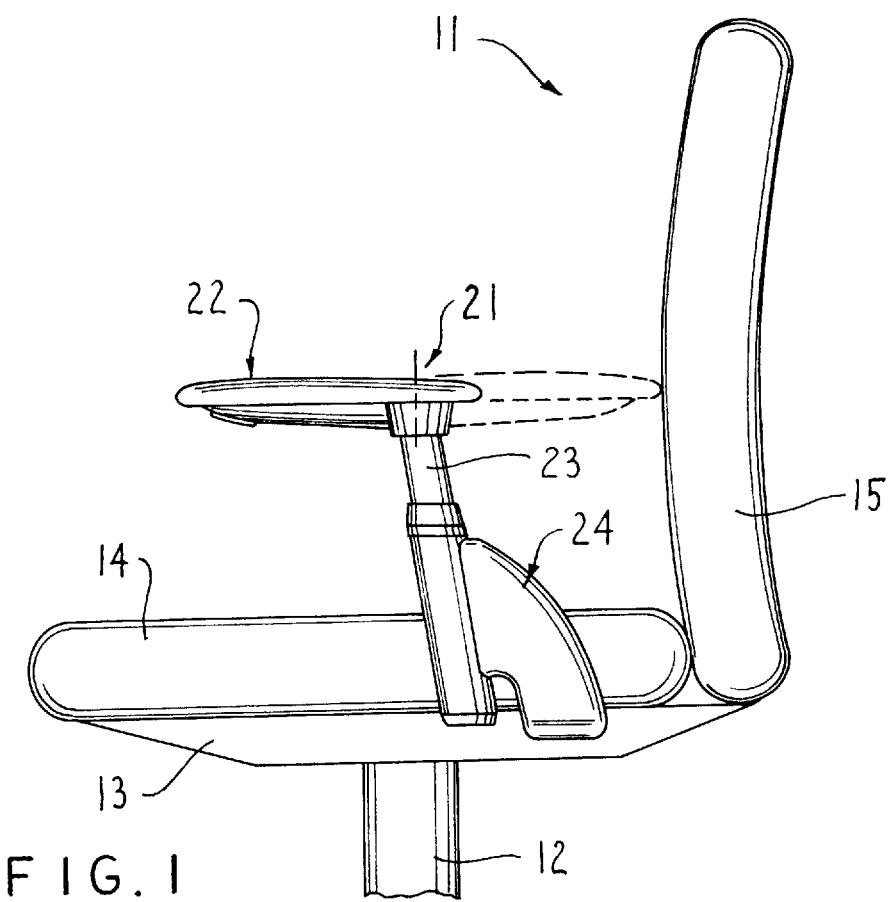
FIG. 1 is a fragmentary side elevational view of a chair having the improved height-adjustable chair arm assembly of this invention mounted thereon, this view showing the left-side chair arm assembly.
Figure 2:
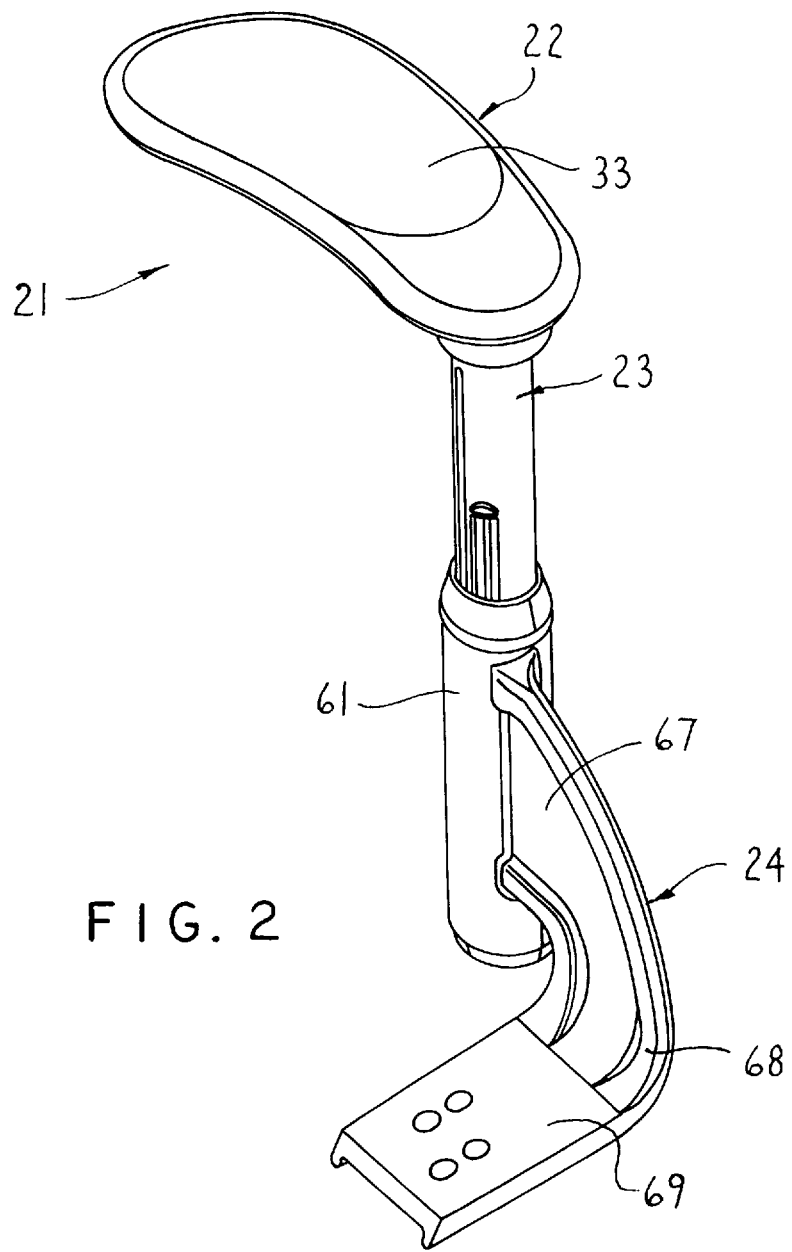
FIG. 2 is a perspective view of a right-side height-adjustable chair arm assembly according to the present invention, the assembly being shown removed from the chair for clarity of illustration.

Certain terminology will be used in the following description for convenience in reference only, and will not be limiting. For example, the words "upwardly", "downwardly", "rightwardly" and "leftwardly" will refer to directions in the drawings to which reference is made. It will be understood that the words "upwardly" and "downwardly" will also refer to the directions of height adjustment of the armrest relative to the chair seat, these being the actual physical directions experienced by the chair occupant during height adjustment. The words "inwardly" and "outwardly" will respectively refer to directions toward and away from the center of the chair, the center of the arm assembly, or designated parts thereof. Said terminology will include the words specifically mentioned, derivatives thereof, and words of similar import.

DETAILED DESCRIPTION

FIG. 1 diagrammatically illustrates a chair 11, often referred to as an office-type chair. This chair employs a center pedestal 12 which projects upwardly from a base (not shown) and mounts on the upper end thereof a suitable chair control or seat frame 13, the latter mounting thereon the chair seat 14. A chair back 15 projects upwardly from adjacent the rear edge of the seat 14.

According to the present invention, the chair 11 is provided with a pair of height-adjustable arm assemblies 21 mounted thereon, namely right and left assemblies which are respectively disposed adjacent the right and left sides of the seat 14 so as to project upwardly therefrom to hence permit the chair occupant to be seated therebetween. The right and left chair arm assemblies 21 are substantially identical except for being mirror images of one another, and only the left-side assembly is visible in FIG. 1.

According to the present invention, and as illustrated by FIGS. 1–5, the height-adjustable chair arm assembly 21 includes an armrest 22 which is elongated generally horizontally so as to be positionable at an elevation significantly above the seat 14 adjacent one side edge thereof. This armrest 22, adjacent one end thereof, connects to an upper end of an upwardly projecting support column 23, the latter having its lower end stationarily but optionally slidably supported within an arm attachment bracket 24. This latter bracket is positioned exteriorly adjacent one side of the seat 14 and projects downwardly and thence inwardly for fixed attachment to the chair control or seat frame 13 in a generally conventional manner.

The armrest 22, as illustrated by FIGS. 4–7, includes a base member 31 which defines thereon a generally horizontally enlarged top surface 32 to which is fixedly secured an arm cap 33, the latter having a suitably contoured exterior upper surface so as to permit comfortable contact with the occupant's arm and elbow. This arm cap 33 will, in one embodiment, be molded of a reasonably hard elastomeric material having limited resiliency, although it will be appreciated that numerous other materials including fabric-covered arm caps can be provided if desired. The base member 31 also has a channel-like rib 34 projecting downwardly, which rib extends longitudinally (i.e. lengthwise) of the base member and defines a lengthwise-extending channel 35 therein. The rib 34 at its rearward end merges into an enlarged support hub 36 which is formed integral with the base member and projects downwardly from the top surface 32. This support hub 36 defines therethrough a generally cylindrical bore 37, the axis 38 of which extends substantially vertically and functions as a swivel axis for the armrest, as explained below.

Figure 6:
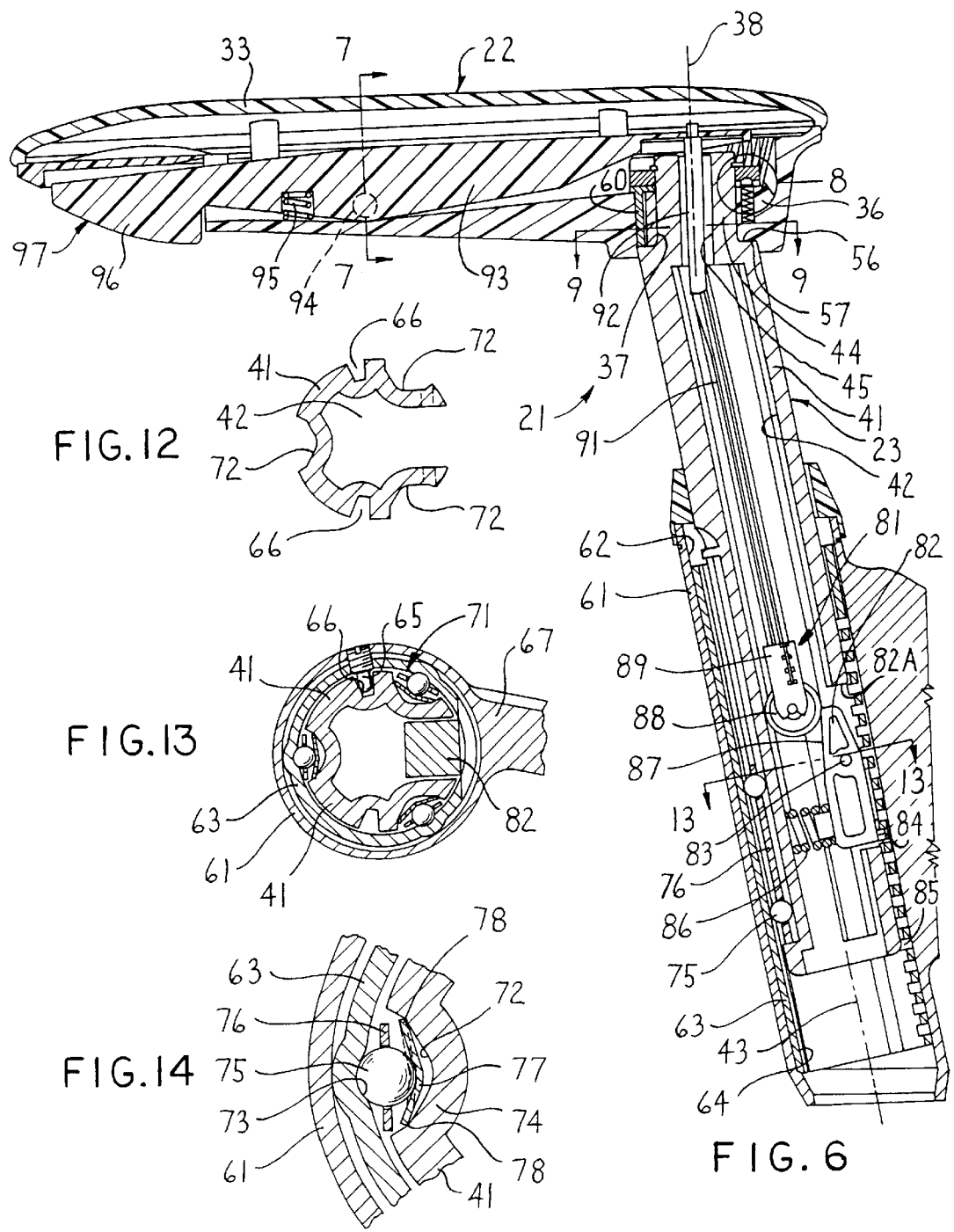
FIG. 6 is a side elevational view of the assembly similar to FIG. 5 but taken generally in central cross section.
Figure 7:
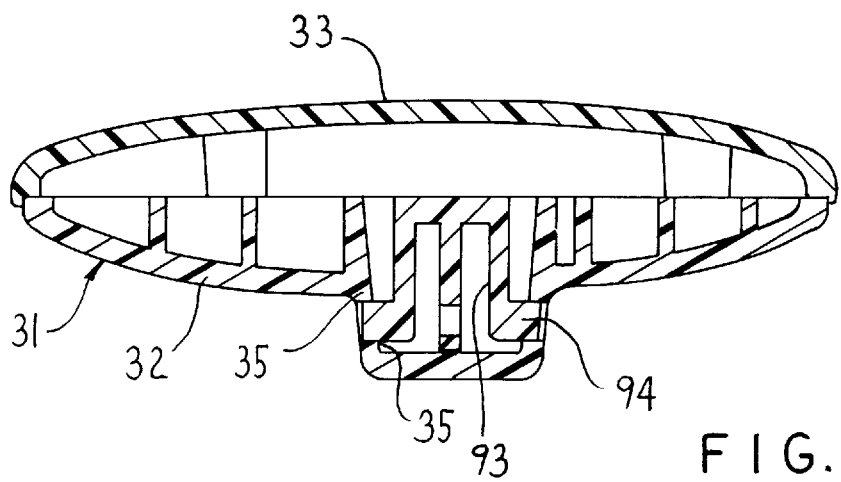
FIG. 7 is a sectional view taken generally along line 7—7 in FIG. 6.
Figure 8:
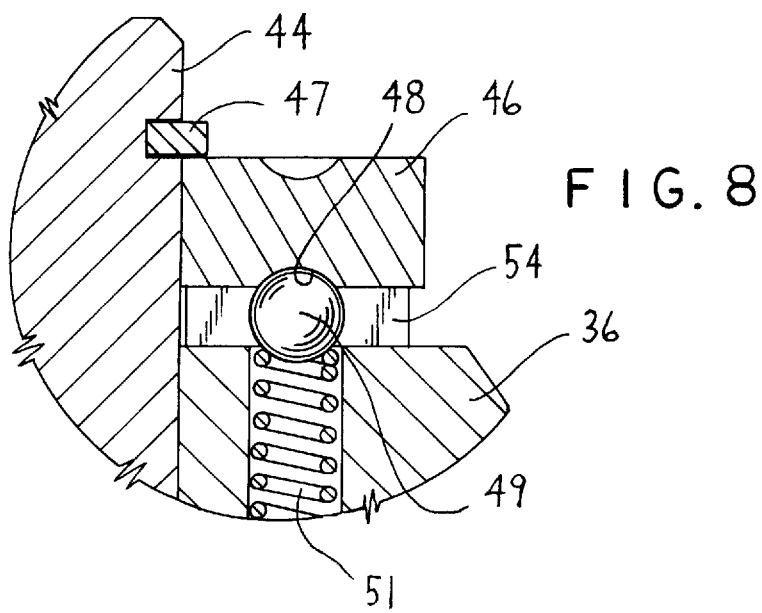
FIG. 8 is an enlarged, fragmentary sectional view of the region enclosed within the circle designated "8" in FIG. 6.

The support column 23, as shown in FIG. 6, comprises a generally vertically elongate column member 41 which is generally cylindrical in cross section and has a central opening 42 extending longitudinally thereof. The column member 41 is disposed so that its longitudinal axis 43, while it projects dominantly vertically, is also slightly inclined in a forward direction relative to the chair seat. The elongate column member 41, at its upper end, has an upwardly projecting cylindrical hub 44 of reduced diameter, which hub has its axis projecting vertically generally along a reduced-diameter opening 45 which also projects axially through the cylindrical hub. This hub 44 projects into and is snugly but relatively rotatably seated within the cylindrical bore 37 defined by the support hub 36 of the armrest, as explained in greater detail below. An upwardly facing shoulder 56 on the support column abuts against an opposed downwardly facing shoulder 57 defined on the support hub 36.

The armrest 22 and column 23 are attached together by a washer or plate 46 which is nonrotatably keyed to the cylindrical hub 44 and is also axially restrained relative thereto by a snap ring 47. This washer 46 on the bottom surface thereof is provided with a plurality of circumferentially spaced detent recesses, one being shown at 48. This detent recess 48 receives therein a detent ball 49 which is urged upwardly by a spring 51 which is confined within a bore or pocket 52 formed in the support hub 36. The ball 49 is circumferentially constrained within a slot or opening 53 formed in a further washer 54, the latter being nonrotatably secured and supported on the hub 36 in surrounding relationship to the cylindrical hub 44, with the upper surface of the washer 54 being maintained in relatively rotatable and supportive bearing engagement with the bottom surface of the washer 46.

Figure 9:
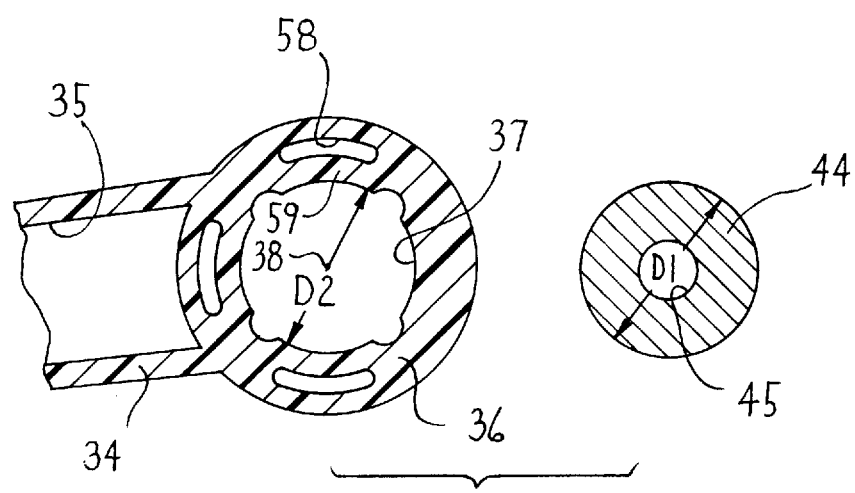
FIG. 9 is a fragmentary, exploded, sectional view taken generally along line 9—9 in FIG. 6.

As illustrated by FIG. 9, the opening 37 as formed in the hub 36 of the base 31 initially has a diameter D2 which is slightly smaller than the exterior diameter D1 of the cylindrical hub 44 formed on the support column 41. However, the annular wall of the hub 36 has a plurality of slots 58 formed axially thereof, which slots 58 are in circumferentially spaced relationship and are circumferentially elongated. These slots are spaced radially outwardly from the inner wall which defines the bore 37, whereby the hub defines a plurality of circumferentially elongate resilient bands or webs 59 which are disposed in circumferentially spaced relationship around a significant extent of the bore 37. Since the hub 36 and in fact the entire arm cap base 31 is preferably formed (as by being molded) of a plastics material, these bands or webs 59 allow a small amount of resilient radial deformation or deflection. Accordingly, when the oversized hub 44 is inserted into the bore 37, the webs 59 resiliently deflect radially outwardly to accommodate the hub 44 and thereby create a snug fit between the hubs 36 and 44. There is thus effectively created a tolerance absorbing (i.e., a zero tolerance) joint between these two hubs. However, since the base 31 is of a rather hard plastic material having reasonably high lubricity or similar bearing-like properties, the arm cap base 31 can still readily swivel about the support hub 44 as indicated by the positional relationships illustrated by FIG. 3.

The washer 54 has a plurality of spike-like legs 60 projecting downwardly from the underside thereof, one such leg 60 projecting into each of the slots 58. The insertion of these legs 60 into the slots 58 performs two functions, the first being to non-rotatably secure the washer 54 with respect to the hub 36, the second being to minimize the radial clearance defined by the slots 58 to hence limit the extent of outward radial deflection of the webs 59. In this respect, sufficient radial clearance is provided to readily enable the hub 44 to be inserted into the bore 37. However, when in this assembled condition, the legs 60 otherwise substantially fully occupy the radial width of the slots 58 to thus prevent any additional significant radial deflection, thereby effectively providing a solid structure which can structurally withstand the downward loads imposed on the armrest.

Figure 3:
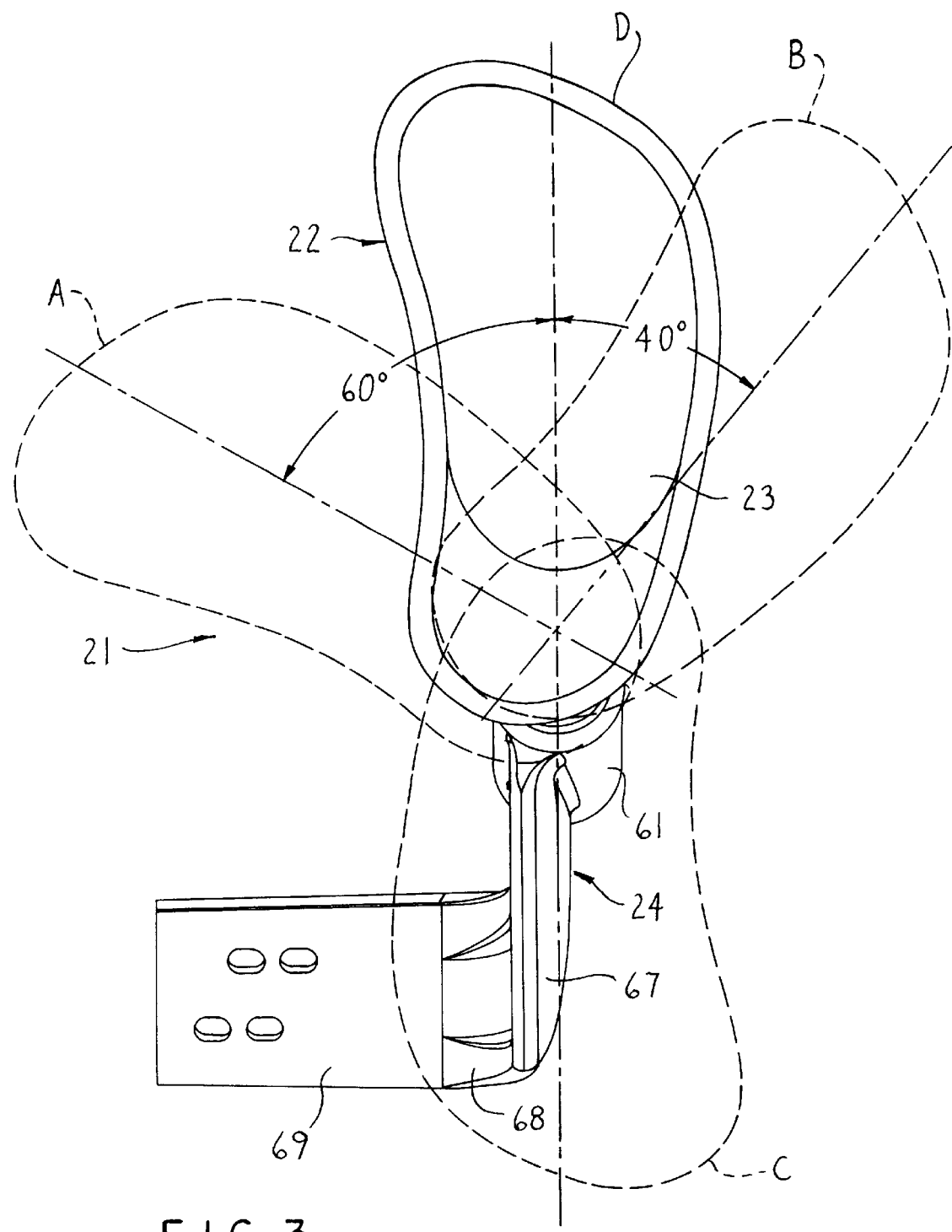
FIG. 3 is a top view of the assembly shown in FIG. 2, with alternative positions of the armrest being shown by dotted lines.
Figure 4:
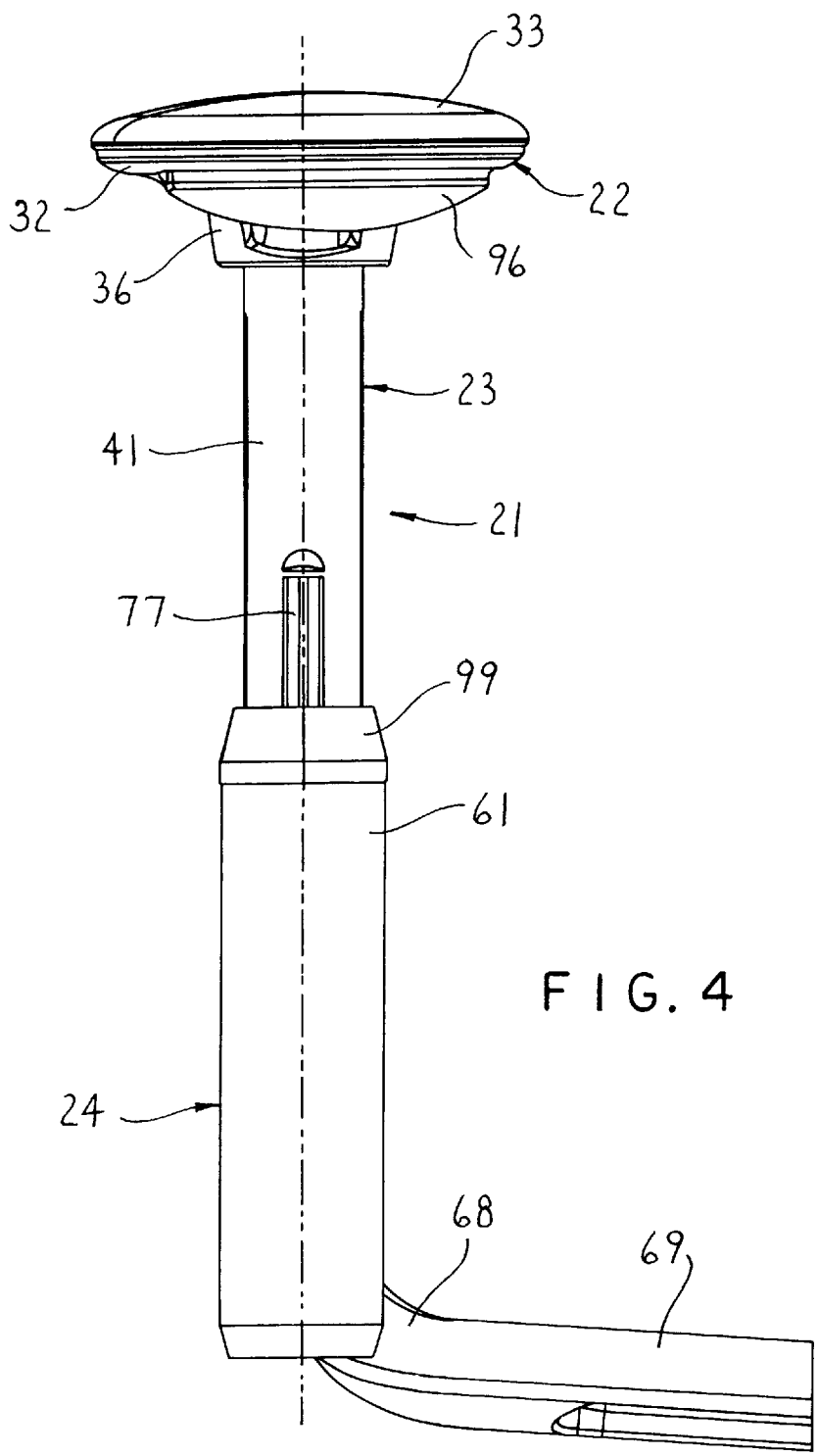
FIG. 4 is a front elevational view of the assembly of FIGS. 2 and 3.
Figure 5:
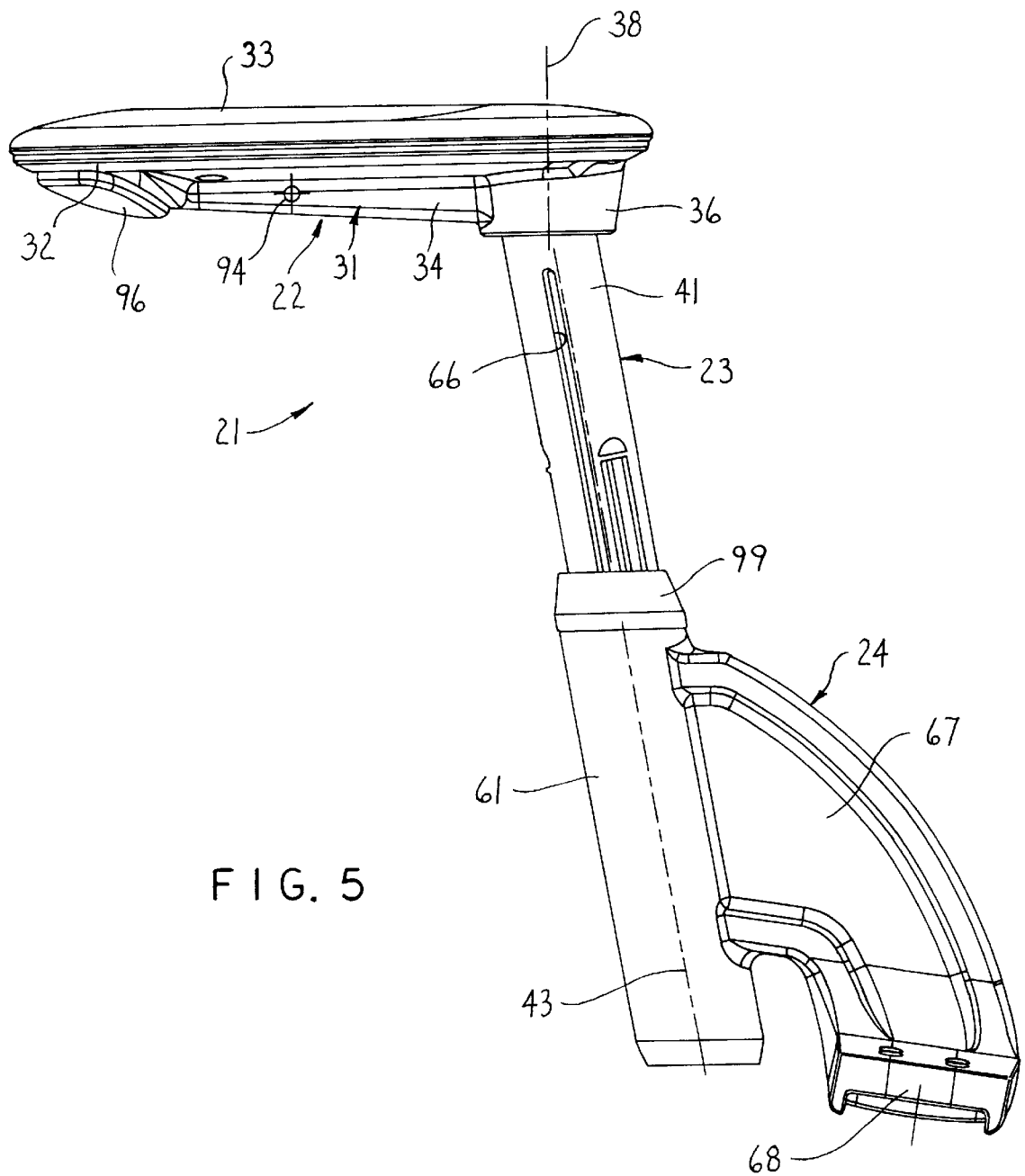
FIG. 5 is a side elevational view of the assembly taken from the/inner side thereof, namely the left side in FIG. 3.

In the illustrated embodiment, the washer 46 preferably has four detent recesses 48 disposed in angularly spaced relationship around the bottom surface thereof, which four recesses are disposed so as to permit the armrest 22 to horizontally swivel about the axis 38 and then be resiliently detented for securement into not only the forwardly extending position designated D as illustrated by solid lines in FIG. 3, but also into inwardly and outwardly angled positions shown by dotted lines and respectively designated at A and B in FIG. 3, as well as a reversely oriented or rearwardly extending position for the armrest, such as also indicated by dotted lines and indicated at position C in FIG. 3.

More specifically, it is contemplated that the armrests will typically be disposed in the rearward position designated C in FIG. 3 when the occupant is sitting in the chair and is carrying out routine functions since rearward position C results in the armrests being disposed more closely adjacent the back of the chair, and hence the armrests are better positioned for supporting the occupant's arms in the region of the elbow and just forward thereof. However, the arm assembly of this invention is particularly desirable for use when the operator is performing intense keyboarding functions i.e., is sitting in front of and operating a computer keyboard. In such use, it is envisioned that the armrests will then be disposed in the inwardly inclined positions designated at A in FIG. 3. In position A, the armrests project forwardly but are angled transversely inwardly, such as at an angle of about 60° relative to the forward direction. This thus results in the armrests angling inwardly directly in front of the occupant, whereby the armrests are disposed so that the occupant can readily support his/her forearms on the armrests to provide support therefor while operating a keyboard. When the occupant wishes to exit the chair, however, the armrests can readily be moved into forward position D so as to not interfere with access to or from the chair. In situations where the operator is operating a computer using a mouse, the mouse is typically mounted on a separate support located to one side of the keyboard. In such situation the appropriate armrest can then be swung outwardly into position B, in which position the armrest still projects forwardly but is angled outwardly at an angle of approximately 40°. This thus enables the user to again support his/her forearm on the armrest while at the same time manipulating the mouse which is positioned on a separate support adjacent one side of the keyboard.

The lower portion of the column member 41 is disposed for supportive engagement within an elongate support tube 61 associated with the arm attachment bracket 24. This support tube 61 is disposed exterior of but adjacent one side of the seat 14 and projects generally vertically relative to the seat in a slightly forwardly inclined relationship, with the support tube 61 being of sufficient axial length as to not only project upwardly above the seat but also downwardly a sufficient extent so that the lower end thereof projects to or slightly below the bottom of the seat. This support tube 61 has a generally cylindrical opening 62 therethrough and its longitudinal axis aligns with the axis 43 of the column member. An elongate sleeve or liner 63 is disposed within and extends lengthwise throughout the majority of the opening 62 and is concentrically fixed within the support tube 61. This sleeve 63 is preferably constructed of a hard plastics material and, in the illustrated embodiment, is preferably initially formed from two half sleeve parts to facilitate installation within the support tube. The sleeve 63 defines therein an interior cylindrical opening 64 in which the lower portion of the column member 41 is axially movably disposed. A stop 65 (FIG. 12) is fixed to the support column 61 and projects inwardly for slidable engagement within an axially elongate groove formed in the exterior surface of the column member 41. This stop 65 is positioned for engaging the lower end of the groove 66 to limit the upward extension of the column 41.

The support tube 61 is part of the arm attachment bracket 24 and, as illustrated by FIGS. 2–5, this bracket also includes a bracket part 67 which has an elbow-shaped configuration in that one end thereof is fixedly attached to the support tube 61, with this bracket part 67 then projecting outwardly in a rearward direction of the chair and then being curved downwardly through an angle of about 90° so as to project downwardly past the side edge of the chair seat 14. This bracket part 67 at its lower end is then horizontally bent inwardly through an angle of about 90°, as depicted by the bend part 68, and the latter in turn joins to an inwardly projecting enlarged mounting plate part 69. This mounting plate part 69 is at least approximately horizontally oriented, and it projects under the chair seat and overlappingly engages an opposed fixed structure associated with the seat frame, and is suitably fixed thereto by fasteners such as screws or bolts, such being accommodated through the plurality of openings provided in the mounting plate part 69. This latter mode of attachment between the chair arm bracket and the seat frame is generally conventional.

The arm attachment bracket 24 of the invention is preferably molded in one piece from a strong and hard plastics material so as to both facilitate construction thereof and at the same time permit the chair arm bracket to have the desired contours.

Considering now the support of the column member 41 within the support tube 61, and referring specifically to FIGS. 6 and 12–14, a resilient anti-friction linear bearing arrangement 71 is provided for supportive and relative linear displacement between the column member 41 and the support liner 63. For this purpose the column member 41 has a plurality of grooves 72 (three grooves in the illustrated and preferred embodiment) formed inwardly from the exterior cylindrical surface thereof, which grooves 72 extend axially of the column member 41 through a selected axial length, and are angularly spaced about the column member, which angular spacing at least approaches uniformity in that at least one groove is uniformly angularly spaced between the other two grooves by intermediate angles which significantly exceed 90°. The liner 63 also has three shallow grooves or tracks 73 formed therein and extending axially therealong, these grooves opening radially outwardly from the inner diameter thereof, and being angularly disposed so that each of the grooves 73 is generally opposed to and radially aligned with one of the grooves 72.

Each cooperating pair of grooves 72 and 73 mount therein a linear ball bearing assembly 74, which assembly includes at least two hardened rolling bearing elements such as balls or spheres 75 associated with an elongate retainer 76 which maintains the balls 75 in the desired spaced relationship axially along the column member. The balls 75 are rollingly engaged with the respective groove or track 73 formed in the liner 63, and are also rollingly engaged with an elongate track member 77 which is disposed within and extends longitudinally of the respective groove 72 formed in the column member 41.

The elongate track member 77 is formed as an elongate thin plate member, preferably being formed from thin spring steel, with the track member initially being performed so as to have a shallow bowed or V-shaped cross section so that, when disposed within the respective groove 72, the track member 77 is supported solely due to the longitudinally extending edges 78 thereof being engaged with the wall of the groove 72. This thus results in the longitudinally extending center portion of the track member 77 being effectively suspended, that is, spaced outwardly from the groove wall. Further, the normal radial spacing between the track member 77 and the opposed track 73 is selected so as to be slightly less than the diameter of the balls 75, such being depicted by the dotted-line position of the track member 77 in FIG. 14. Hence, the presence of the balls 75 causes the cross-sectional center portion of the track member 77 to resiliently deflect radially inwardly into a position diagrammatically depicted by solid lines in FIG. 14, thereby causing the track member 77 to assume an increased bowed or V-shaped configuration. The track member 77 effectively functions as a plate spring in that it continuously imposes a small resilient force radially outwardly against the balls 75, which in turn maintains the balls 75 in continuous rolling or contacting engagement with the outer tracks 73. The resiliency and biasing force imposed on the balls is selected so that play or clearance in all of the bearing assemblies is eliminated at all times so that the column 41 will always maintain a snug fit within the support tube 61, but at the same time the linear ball bearing assemblies provide a minimal or controlled amount of frictional drag to enable the column 41 to be easily linearly displaced in a controlled manner either upwardly or downwardly during a manual height-adjusting operation.

To maintain the armrest 22 in the selected height position but at the same time permit the height to be easily varied, the arm assembly 21 incorporates therein a releasable latching assembly 81 (FIG. 6) which includes cooperating parts which extend from the tip of the armrest 22 downwardly through the support column 23 for cooperation with the attachment bracket 24.

More specifically, the latching assembly 81 includes a latch 82 which is disposed within and carried on the column member 41 adjacent the lower end thereof, which latch is supported on the column member by a pivot pin 83 which extends generally horizontally in perpendicular relationship to the axis 43. The latch 82 is positioned generally adjacent and partially within a rectangular window or cutout 83A formed in the rear end of the column 41, and the latch has a lug or finger 84 which projects rearwardly from the lower end thereof and is adapted for engagement within one of a vertically-spaced series of latching slots 85 formed in the adjacent side wall of the liner 63. A spring 86 cooperates between the opposed side of the column 41 and the lower end of the latch 82 so as to normally pivotally urge the latch into a latching position substantially as indicated by FIG. 6.

The latch 82 is activated into a released position by a roller 88 which rolls along an opposed inner side of the column 41 and also rolls along a cam surface 87 formed on the inner side of the latch 82 so that axial downward movement of the roller 88 and its engagement with the surface 87 causes the latch 82 to pivot in opposition to the spring 86 (clockwise in FIG. 6 about the pivot pin 83) so as to effect release of the latch lug 84 from the latch slot 85.

The roller 88 is mounted on the lower end of a yoke 89, the latter being secured to an elongate push rod 91 which projects upwardly through the column member 41 and terminates in a pinlike actuator part 92, the latter projecting upwardly through the cylindrical hub 44. The push rod 91 is normally maintained in a raised position due to spring 86 maintaining latch 82 in its latched position, whereby the cam surface 87 on latch 82 reacts against the roller 88 and hence maintains the push rod in its raised position.

The upper end of the actuator pin 92 is coupled to the rearward end of an elongate actuating lever 93 which is pivotally supported on and projects longitudinally of the armrest 22. This actuating lever 93 is, intermediate the length of the armrest, pivotally supported by pivot or hinge pin 94 which is engaged within suitable hinge openings formed in the ribs 34, whereby the actuating lever 93 extends longitudinally along the channel 35 defined between these ribs. The hinge part 94 defines a generally horizontal hinge axis which projects transversely of the lengthwise extent of the armrest. A spring 95 cooperates between the actuating lever 93 and the arm cap base 32 so as to normally urge the actuating lever 93 in a clockwise direction about the hinge 94, thereby maintaining the rear end of lever 93 in contact with the upper end of actuator pin 92.

The actuating lever 93 at its forward free end is provided with an enlarged button part 96 which is positioned on the underside of the armrest 22 directly at the front free end thereof. This button part 96 has an exterior downwardly-facing bottom surface which is enlarged and has a smoothly rounded contour so that the chair occupant, when seated, can position a hand in engagement with the free end of the armrest, and then wrap the fingers around the armrest free end for engagement with the button part 96. By exerting an upward pressure on the button part by the fingers, such as by squeezing the free end of armrest between the fingers and the palm, the button part 96 is moved upwardly against the urging of the spring 95, causing a corresponding clockwise pivoting of actuating lever 93 about the hinge 94. This effects a downward pushing of the push rod 91 within the column 41, whereupon roller 88 rolls downwardly along the cam surface 87 which, due to the wedging relationship created relative to the opposed inner wall of the column member, causes the pawl 82 to pivot clockwise about the pivot 83 and effect withdrawal of the latch projection 84 from the latch slot 85. With the latch so released, and the occupant still gripping the front end of the armrest and depressing the latch button 96, the occupant can then easily raise or lower the armrest 22 using minimal force or effort until reaching the desired elevation or height, at which time the finger pressure on the button part 96 is relieved so that the springs restore the latch mechanism back to its original positions. In the event that the latch projection 84 is not perfectly aligned with one of the latching slots 85, then the operator merely has to slightly raises or lowers the armrest, and this causes the latch projection 84 to align with and be automatically spring engaged into one of the latching slots 85.

The chair arm assembly is additionally preferably provided with an annular cap 96 which is secured to the upper end of the support tube 61 in surrounding relation with the column 41 so as to eliminate sharp or abrupt edges, and improve the overall appearance of the assembly.

The operation of the chair arm assembly has already been described in conjunction with the structural description set forth above, so that further detailed description of the operation is believed unnecessary.

Figure 15:
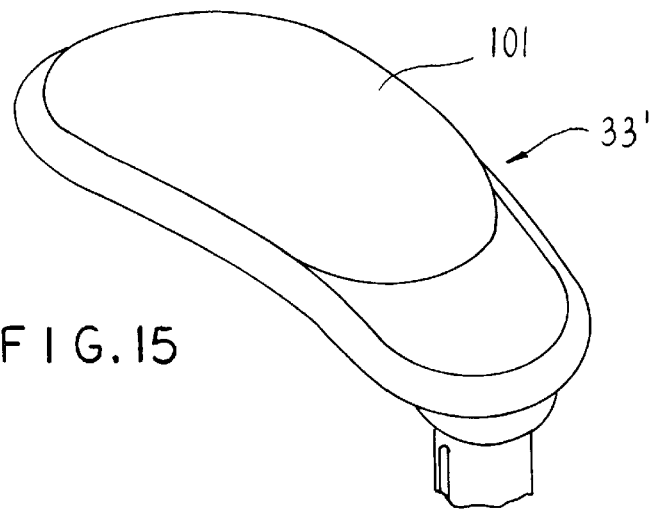
FIG. 15 is a fragmentary perspective view of a modified arm cap according to the invention.
Figure 16:
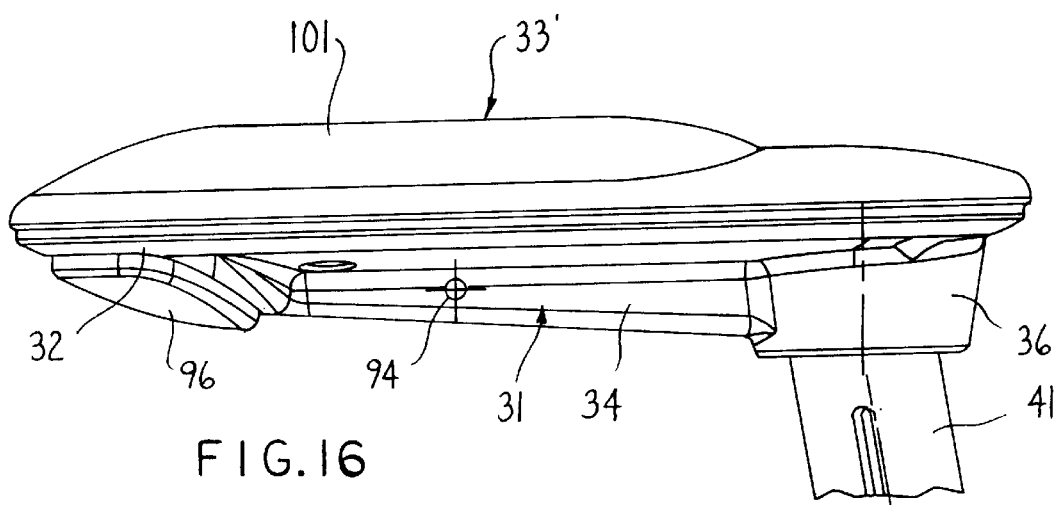
FIG. 16 is a side elevational view of the arm cap of FIG. 15.
Figure 17:
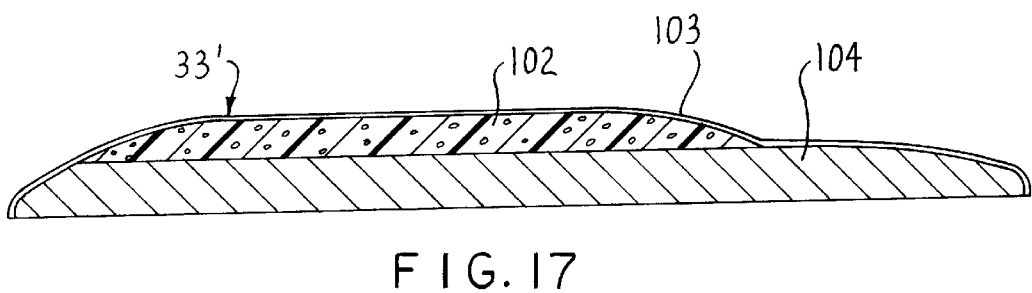
FIG. 17 is a cross sectional view taken generally along line 17—17 in FIG. 16.

Referring now to FIGS. 15–17, there is illustrated a modified arm cap 33' for use on the armrest of this invention. This modified arm cap 33' is provided with the front region 101 thereof being of a raised and increased thickness, the latter being defined by a molded gel 102 captivated by an exterior flexible covering 103. This covering and gel are both disposed over the underlying arm cap member 104, the latter typically being of molded urethane or similar plastic.

The presence of this gel layer 102, which layer effectively overlaps the entire arm cap over about the front two-thirds of the length thereof, permits for more uniform distribution of pressure when the occupant's arm or elbow is in contact therewith, effectively preventing or minimizing any bottoming out of the resiliency, and thereby providing a more comfortable and ergonomically desirable contact relationship with the occupant's arm and elbow, particularly for use in environments where the occupant is seated in the chair and is performing intensive work functions such as keyboarding. The gel is a conventional and known product, typically a silicon-base gel.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a chair having a seat assembly, a back projecting upwardly from and adjacent a rear edge of the seat assembly, and a height-adjustable arm assembly mounted on and disposed adjacent one side of said seat assembly and projecting upwardly in cantilevered relation therefrom, the improvement wherein said arm assembly comprises:

an arm attachment bracket fixed to said seat assembly and including a vertically elongate support tube disposed adjacent said one side of said seat assembly, said support tube defining therein a lengthwise and vertically elongate guide bore which is open at the upper end thereof;

a vertically elongate support column lengthwise movably supported within said bore and projecting upwardly therefrom and terminating at an upper end part which is disposed at an elevation spaced upwardly above said seat assembly;

a horizontally elongate armrest mounted on the upper end part of said support column and projecting horizontally therefrom so as to terminate at a free end, said armrest having a hub part which is horizontally rotatable supported on the upper end part of said support column for permitting said armrest to be horizontally swingably displaced about a substantially vertical axis relative to said support column;

a releasable latch arrangement coacting between the support column and the support tube for permitting the support column to be stationarily fixedly positioned relative to the support tube at any one of a plurality of selectable height positions, said latch arrangement including a latch member movably supported on and carried by said support column and being movable between a release position and a latching position, said latch member when in said latching position being engaged with one of a series of latching stops which are formed in lengthwise-spaced relation along said support tube; and a latch-activating mechanism extending from said armrest through said support column for displacing said latch member into a released position, said latch-activating mechanism including an activating lever extending lengthwise of and pivotally supported on said armrest and terminating in a manually-engageable button part disposed on an underside of said armrest adjacent the free end thereof, and an activating rod extending interiorly and lengthwise of said support column and having a lower end cooperating with said latch member and an upper end cooperating with said activating lever, the upper end part of said column comprises a tube portion which is rotatably supported within said hub part, said activating rod having an upper end part which projects coaxially upwardly through said tube portion and is engaged by a rearward end of said activating lever.

2. In a chair having a seat assembly, a back projecting upwardly from and adjacent a rear edge of the seat assembly, and a height-adjustable arm assembly mounted on and disposed adjacent one side of said seat assembly and projecting upwardly in cantilevered relation therefrom, the improvement wherein said arm assembly comprises:

an arm attachment bracket fixed to said seat assembly and including a vertically elongate support tube disposed adjacent said one side of said seat assembly, said support tube defining therein a lengthwise and vertically elongate guide bore which is open at the upper end thereof;

a vertically elongate support column lengthwise movably supported within said bore and projecting upwardly therefrom and terminating at an upper end part which is disposed at an elevation spaced upwardly above said seat assembly;

a horizontally elongate armrest mounted on the upper end part of said support column and projecting horizontally therefrom so as to terminate at a free end, said armrest having a hub part which is horizontally rotatable supported on the upper end part of said support column for permitting said armrest to be horizontally swingably displaced about a substantially vertical axis relative to said support column, said chair including a multi-position resilient detent arrangement cooperating between said armrest and said support column for permitting the armrest to be maintained in a plurality of different positions which are horizontally angularly displaced from one another about said swivel axis;

a releasable latch arrangement coacting between the support column and the support tube for permitting the support column to be stationarily fixedly positioned relative to the support tube at any one of a plurality of selectable height positions, said latch arrangement including a latch member movably supported on and carried by said support column and being movable between a release position and a latching position, said latch member when in said latching position being engaged with one of a series of latching stops which are formed in lengthwise-spaced relation along said support tube; and a latch-activating mechanism extending from said armrest through said support column for displacing said latch member into a released position, said latch-activating mechanism including an activating lever extending lengthwise of and pivotally supported on said armrest and terminating in a manually-engageable button part disposed on an underside of said armrest adjacent the free end thereof, and an activating rod extending interiorly and lengthwise of said support column and having a lower end cooperating with said latch member and an upper end cooperating with said activating lever.

3. In a chair having a seat assembly, a back projecting upwardly from and adjacent a rear edge of the seat assembly, and a height-adjustable arm assembly mounted on and disposed adjacent one side of said seat assembly and projecting upwardly in cantilevered relation therefrom, the improvement wherein said arm assembly comprises:

an arm attachment bracket fixed to said seat assembly and including a vertically elongate support tube disposed adjacent said one side of said seat assembly, said support tube defining therein a lengthwise and vertically elongate guide bore which is open at the upper end thereof;

a vertically elongate support column lengthwise movably supported within said bore and projecting upwardly therefrom and terminating at an upper end part which is disposed at an elevation spaced upwardly above said seat assembly;

a horizontally elongate armrest mounted on the upper end part of said support column and projecting horizontally therefrom so as to terminate at a free end, said armrest having a hub part which is horizontally rotatable supported on the upper end part of said support column for permitting said armrest to be horizontally swingably displaced about a substantially vertical axis relative to said support column;

a releasable latch arrangement coacting between the support column and the support tube for permitting the support column to be stationarily fixedly positioned relative to the support tube at any one of a plurality of selectable height positions, said latch arrangement including a latch member movably supported on and carried by said support column and being movable between a release position and a latching position, said latch member when in said latching position being engaged with one of a series of latching stops which are formed in lengthwise-spaced relation along said support tube; and a latch-activating mechanism extending from said armrest through said support column for displacing said latch member into a released position, said latch-activating mechanism including an activating lever extending lengthwise of and pivotally supported on said armrest and terminating in a manually-engageable button part disposed on an underside of said armrest adjacent the free end thereof, and an activating rod extending interiorly and lengthwise of said support column and having a lower end cooperating with said latch member and an upper end cooperating with said activating lever, said activating lever being horizontally rotatably connected to said upper end of said activating rod so as to effect movement of said activating rod vertically along said support column while permitting said horizontal swinging displacement of said armrest relative to said support column.

4. In a chair having a seat assembly, a back projecting upwardly from and adjacent a rear edge of the seat assembly, and a height-adjustable arm assembly mounted on and disposed adjacent one side of said seat assembly and projecting upwardly in cantilevered relation therefrom, the improvement wherein said arm assembly comprises:

an arm attachment bracket fixed to said seat assembly and including a vertically elongate support tube disposed adjacent said one side of said seat assembly, said support tube defining therein a lengthwise and vertically elongate guide bore which is open at the upper end thereof;

a vertically elongate support column lengthwise movably supported within said bore and projecting upwardly therefrom and terminating at an upper end part which is disposed at an elevation spaced upwardly above said seat assembly;

a horizontally elongate armrest mounted on the upper end part of said support column and projecting horizontally therefrom so as to terminate at a free end;

a releasable latch arrangement coacting between the support column and the support tube for permitting the support column to be stationarily fixedly positioned relative to the support tube at any one of a plurality of selectable height positions, said latch arrangement including a latch member pivotally supported on and carried by said support column and being movable between a release position and a latching position, said latch member when in said latching position being engaged with one of a series of latching stops which are formed in lengthwise-spaced relation along said support tube; and a latch-activating mechanism extending from said armrest through said support column for displacing said latch member into a released position, said latch-activating mechanism including an activating lever extending lengthwise of and pivotally supported on said armrest and terminating in a manually-engageable button part disposed on an underside of said armrest adjacent the free end thereof, and an activating rod extending interiorly and lengthwise of said support column and having a lower end cooperating with said latch member and an upper end cooperating with said activating lever, said activating lever moving said activating rod vertically, said lower end of said activating rod and said latch member including cooperating cam surfaces which are inclined such that vertical movement of said activating rod effects pivoting of said latch member from said latching position to said release position.

5. A chair according to claim 4, wherein said cam surface of said activating rod is defined by a roller rotatably connected to said lower end of said activating rod.

6. A chair according to claim 5, wherein said roller is wedged between said cam surface of said latch member and an interior surface of said support column.

7. A chair according to claim 5, wherein said latch member includes a projection on one end thereof which engages said one of said latching stops when said latch member is in said latching position and a camming surface on an opposite end of said latch member, said cam surface and said projection being disposed on opposite sides of a pivot axis about which said latch member pivots, said activating rod contacting said cam surface of said latch member so as to disengage said projection from said one of said latching stops.

8. A chair according to claim 7, which includes biasing means for biasing said latch member to said latching position.

9. In a chair having a seat assembly and a pair of height-adjustable arm assemblies mounted on and disposed adjacent opposite sides of said seat assembly and projecting upwardly in cantilevered relation therefrom, the improvement wherein said arm assembly comprises:

an arm attachment bracket fixed to said seat assembly and including a vertically elongate support tube disposed adjacent one side of said seat assembly, said support tube defining therein a lengthwise and vertically elongate guide bore which is open at the upper end thereof;

a vertically elongate support column lengthwise movably supported within said bore and projecting upwardly therefrom and terminating at an upper end part;

an armrest mounted on the upper end part of said support column;

a releasable latch arrangement coacting between the support column and the support tube for permitting the support column to be stationarily fixedly positioned relative to the support tube at any one of a plurality of selectable height positions, said latch arrangement including a latch member movably supported on and carried by said support column and being movable between a release position and a latching position, said latch member when in said latching position being engaged sidewardly with one of a series of latching stops which are formed in lengthwise-spaced relation along said support tube; and a latch-activating mechanism extending from said armrest through said support column for displacing said latch member to said release position, said latch-activating mechanism including an activating lever terminating in a manually-engageable button part disposed on an underside of said armrest, and an activating rod extending interiorly and lengthwise of said support column and having a lower end cooperating with said latch member and an upper end cooperating with said activating lever such that said activating lever moves said activating rod vertically, said latch member having an inclined cam surface, and said lower end abutting against said cam surface such that movement of said activating rod vertically effects sideward movement of said latch member to said release position.

10. A chair according to claim 9, wherein said armrest has a hub part which is horizontally rotatably supported on the upper end part of said support column for permitting said armrest to be horizontally swingably displaced about a substantially vertical axis relative to said support column.

11. A chair according to claim 10, wherein said activating rod has an upper end part which projects upwardly and is engaged by a rearward end of said activating lever so as to permit said horizontal swinging displacement of said armrest.

12. A chair according to claim 9, wherein said latch member is pivotally connected to said support column, said latch member being pivotable about a generally horizontal pivot axis so that said cam surface is moved sidewardly in response to movement of said activating rod vertically.

13. A chair according to claim 9, wherein said activating rod includes a projection on said lower end thereof which has first and second sides facing away from each other, said first side contacting said cam surface and said second side contacting an interior surface of said support column such that said cam surface is moved sidewardly in response to movement of said activating rod vertically.

14. A chair according to claim 9, wherein said lower end of said activating rod includes a cylindrical projection on said lower end thereof which acts against said cam surface.

15. A chair according to claim 14, wherein said cam surface moves sidewardly in response to movement of said cylindrical projection vertically.

16. A chair according to claim 15, wherein said cylindrical projection is a roller rotatably connected to said lower end of said activating rod.

17. A chair according to claim 15, wherein said latch member is pivotally connected to said support column, said latch member including a lug which sidewardly engages said one of said latching stops, said sideward movement of said cam surface effecting pivoting of said latch member such that said lug is disengaged from said one of said latching stops.

18. A chair according to claim 7, wherein said latch member includes said cam surface on one end thereof and said lug on an opposite end thereof such that sideward movement of said cam surface in a first sideward direction effects sideward movement of said lug in a second sideward direction opposite said first sideward direction.

19. In a chair having a seat assembly and a height-adjustable arm assembly disposed on one side of said seat assembly and projecting upwardly therefrom, the improvement wherein said arm assembly comprises:

a vertically elongate support tube disposed adjacent said one side of said seat assembly, said support tube defining therein a lengthwise and vertically elongate guide bore which has an open end;

a vertically elongate support column lengthwise movably supported within said bore and projecting vertically from said open end;

an armrest which is supported on said seat assembly by said support tube and said support column which extend vertically therebetween;

a releasable latch arrangement coacting between the support column and the support tube for permitting the support column to be stationarily fixedly positioned relative to the support tube at any one of a plurality of selectable height positions, said latch arrangement including a latch member movably supported on and carried by said support column and being movable between a released position and a latching position, said latch member when in said latching position being engaged sidewardly with one of a series of latching stops which are formed in lengthwise-spaced relation along said support tube; and a latch-activating mechanism connected to said latch member for displacing said latch member to said release position, said latch-activating mechanism including a manually-engageable actuator, and an activating rod extending interiorly and lengthwise of said support column and having a drive end cooperating with said latch member and an opposite end cooperating with said actuator such that said actuator moves said activating rod vertically, said drive end of said activating rod and said latch member having cooperating surfaces such that movement of said activating rod vertically effects sideward movement of said latch member to said release position, said latch-activating mechanism further including biasing means acting sidewardly on said latch member for moving said latch member to said latching position while effecting vertical movement of said activating rod.

20. A chair according to claim 19, wherein said latch member moves in a sideward direction and said cooperating surfaces are oriented transverse to said sideward direction.

21. A chair according to claim 19, wherein said latch member is pivotally connected to said support column.

22. In a chair having a seat assembly, a back projecting upwardly from a location adjacent a rear edge of the seat assembly, and a pair of height-adjustable arm assemblies mounted on and disposed adjacent opposite sides of said seat assembly and projecting upwardly in cantilevered relation therefrom, the improvement wherein each arm assembly comprises:

an arm upright fixed to said seat assembly and including a vertically elongate support segment disposed on one side of said seat assembly, said support segment defining therein a vertically elongate guide bore which is open at an upper end thereof;

an armrest having a vertically elongate slide tube lengthwise movably supported within said guide bore and projecting upwardly therefrom and terminating at an upper end part which is disposed at an elevation spaced upwardly above said seat assembly, said armrest further having a horizontally elongate arm element mounted on the upper end part of said slide tube and projecting horizontally therefrom;

a releasable latch arrangement coacting between said support segment and said slide tube for permitting said slide tube to be stationarily fixedly positioned relative to said support segment at any one of a plurality of selectable height positions, said latch arrangement including a latch member movably supported and carried in said slide tube and being movable between a release position and a latching position, said latch member when in said latching position being engaged with one of a series of latching notches which are formed in lengthwise-spaced relation along said support segment; and a latch-activating mechanism extending from said armrest into said support segment for displacing said latch member between said release position and said latching position, said latch-activating mechanism including an activating arm extending lengthwise of and movably supported on said arm element and terminating in a manually-engageable button part disposed at an underside of said arm element adjacent an end portion thereof, and an activating rod extending interiorly and lengthwise of said support segment and having an upper end cooperating with said activating arm and a lower end engaging a roller which cooperates with a cam surface of said latch member.

23. A height-adjustable arm assembly for a chair, comprising:

an arm upright including a vertically elongate support segment, said support segment defining therein a vertically elongate guide bore which is open at an upper end thereof;

an armrest having a vertically elongate slide tube lengthwise movably supported within said guide bore and projecting upwardly therefrom and terminating at an upper end part, said armrest further having a horizontally elongate arm element mounted on the upper end part of said slide tube and projecting horizontally therefrom;

a releasable latch arrangement coacting between said support segment and said slide tube for permitting said slide tube to be stationarily fixedly positioned relative to said support segment at any one of a plurality of selectable height positions, said latch arrangement including a latch member movably supported and carried by said slide tube and being movable between a latching position and a release position, said latch member when in said latching position being engaged with one of a series of latching notches which are formed in lengthwise-spaced relation along said support segment; and a latch-activating mechanism extending from said armrest into said support segment for displacing said latch member between said latching position and said release position, said latch-activating mechanism including an activating lever extending lengthwise of and pivotally supported on said arm element and terminating in a manually-engageable button part disposed at an underside of said arm element adjacent an end portion thereof, and an activating rod extending interiorly and lengthwise of said support segment and having an upper end cooperating with said activating lever and a lower end engaging a roller which cooperates with a cam surface of said latch member.

24. A height-adjustable arm assembly for a chair, comprising:

an arm upright including an elongate support segment, said support segment defining therein a guide bore which is open at one end thereof, said support segment having a series of latching notches formed therein;

an armrest having a slide tube and an arm element, said slide tube having a first end which is supported within said guide bore and a second end which is attached to said arm element;

a latch arrangement for permitting said slide tube to be positioned relative to said support segment at any one of a plurality of height positions, said latch arrangement including a latch member being movable between a latching position and a release position, said latch member being engaged with one of the series of latching notches when in said latching position; and a latch-activating mechanism for moving said latch member between said latching position and said release position, said latch-activating mechanism including an activating lever supported on said arm element, and an activating rod extending into said support segment, said activating rod having an upper end cooperating with said activating lever and a lower end engaging a roller which cooperates with a cam surface of said latch member.

* * * * *

UNITED STATES PATENT AND TRADEMARK OFFICE
CERTIFICATE OF CORRECTION

PATENT NO. : 5,853,223
DATED : December 29, 1998
INVENTOR(S) : Robert T. Ritt et al.

It is certified that error appears in the above-identified patent and that said Letters Patent is hereby corrected as shown below:

Title page, item [75]; change to read as follows:
--Inventors: Robert T. Ritt, Holland Township, Ottawa County; Steve J. Nemeth, Jr., Park Township, Ottawa County, both of Michigan.--

Column 10:
Line 56, change "rotatable" to --rotatably--.

Column 11:
Line 43, change "rotatable" to --rotatably--.

Column 14:
Line 26, change "claim 7" to --Claim 17--

Signed and Sealed this

Nineteenth Day of June, 2001

*Attest:*

*Attesting Officer*

NICHOLAS P. GODICI
*Acting Director of the United States Patent and Trademark Office*